INVENTOR:
WILLIAM L. ROEVER
BY: *Louis J. Bovasso*
HIS ATTORNEY

Sept. 2, 1969  W. L. ROEVER  3,464,513
ACOUSTIC APPARATUS FOR MAPPING THE SURFACE
CHARACTERISTICS OF A BOREHOLE
Filed April 24, 1968  2 Sheets-Sheet 2

INVENTOR:
WILLIAM L. ROEVER
BY: Louis J. Bovasso
HIS ATTORNEY

United States Patent Office 3,464,513
Patented Sept. 2, 1969

3,464,513
ACOUSTIC APPARATUS FOR MAPPING THE SURFACE CHARACTERISTICS OF A BOREHOLE
William L. Roever, New Orleans, La., assignor to Shell Oil Company, New York, N.Y., a corporation of Delaware
Filed Apr. 24, 1968, Ser. No. 723,789
Int. Cl. G01v 1/00
U.S. Cl. 181—.5               1 Claim

ABSTRACT OF THE DISCLOSURE

A method and apparatus for investigating subterranean formations adjacent a borehole containing a borehole fluid by transmitting a pulsed beam of ultrasonic radiation through the borehole fluid in an inclined path against the adjacent formations wherein the pulsed beam is guided through acoustic waveguides wherein the velocity is greater and the attenuation is less than in the borehole fluid.

BACKGROUND OF THE INVENTION

Field of the invention

This invention relates to an acoustic method for mapping the inner wall of a tubular opening containing a fluid and more particularly to an acoustic method that will accurately map the entire wall of a tubular opening, such as a well borehole.

Description of the prior art

Many procedures have been developed in the past to map the wall of a borehole that penetrates various earth formations. Normally these procedures have utilized various photographic means for photographing the wall of a borehole and transmitting the picture image to the surface. Also, various systems have been developed that use deformable materials for obtaining an impression of the wall of a borehole. In addition to the above methods that attempt to obtain a pictorial representation of the physical characteristics of the borehole, systems using various physical stresses, as, for example, acoustical energy, resistivity and conductivity, have been used to log a borehole to obtain responses that indicate the characteristics of various formations penetrated by the borehole.

Of the above methods, those that obtain a pictorial representation of the borehole wall have several limitations. For example, those that attempt to use light to photograph the borehole wall or scan the borehole wall with a television camera are limited to boreholes containing an optically transparent liquid. This limitation means that such systems are limited almost exclusively to boreholes that are drilled as water wells or are capable of being filled with water. Thus, such systems are of little use in surveying boreholes that are normally drilled as petroleum producing wells. Petroleum wells are normally drilled using a drilling mud that is weighted with various materials to prevent an inflow of fluid from fluid containing formations. While in some isolated cases it is possible to replace the drilling mud with water and still control the well, such cases are extremely rare.

Systems that depend upon the use of a deformable material to take a physical impression of the formation surface are limited due to the inability to survey any great length of borehole.

Systems that use various logging techniques such as acoustical or resistivity techniques for mapping a borehole wall have in the past provided only sketchy and inaccurate presentations of the formations. For example, one system utilizes a relatively small number of sensing elements and then plots the response of each element separately, thereby providing only a limited amount of information concerning the characteristics of the borehole wall.

Thus, some prior art systems require coring while drilling which is expensive and can only be done while drilling. Remote television cameras require a clear, transparent medium in the well and are generally too temperature sensitive for general use. Such methods are inadequate for full condition evaluation.

One suggested acoustic method is disclosed in application Ser. No. 724,182, filed Apr. 25, 1968, to Adair. This invention is an improvement over the method suggested by the above application. In the method disclosed in Ser. No. 724,182, the pulsed beams are attenuated in traveling through the borehole fluid. The acoustic transducer must be rotated within the borehole thus resulting in the necessity for utilizing moving parts which must function under high stresses.

SUMMARY OF THE INVENTION

It is an object of this invention to provide an acoustic logging method which will operate in opaque borehole drilling fluids at borehole temperatures to accurately map a borehole wall with high resolution in a comparatively short time.

It is a further object of this invention to measure only acoustic waves that are reflected from the wall surface of a borehole, thereby providing a sharper delineation of features than a penetrating-type of acoustic velocity measurement.

It is another object to cover more area of the borehole wall per acoustic pulse compared to present acoustic methods, thus permitting a better coverage of the wall area for a given logging speed.

It is still a further object of this invention to provide an acoustic logging device and method which minimizes the path of the acoustic impulse in the borehole fluid thus minimizing the effect of attenuation of the pulses by the borehole fluid.

It is still another object to provide an acoustic device that has no moving parts but is adapted to map the entire borehole wall as the tool is moved through the borehole at reasonable logging speeds.

The system of this invention utilizes acoustic energy for mapping the subterranean formations adjacent a borehole containing a borehole fluid. The borehole may also be any cavity having approximately a cylindrical shape such as the inside of a pipe or the hole resulting from drilling in the earth's crust. In a preferred embodiment, an acoustic scanner is lowered into a borehole containing a borehole fluid. The scanner is then actuated to transmit, at a known azimuth angle relative to a reference direction such as magnetic north, a pulsed beam of ultrasonic radiation which reflects energy back from any irregularities of substantially constant borehole diameter encountered by the pulsed beam. Any small irregularities encountered will scatter ultrasonic radiation in all directions and that radiation which returns along the reverse path of the outgoing signal will be preferentially detected and recorded. This method results in th recording of an electrical signal representing the surface characteristics of a narrow strip of the borehole wall for each pulse of acoustic energy from the scanner.

In one preferred embodiment, a plurality of transmitting-receiving transducers are used to transmit and receive the pulsed beams. The transducers are located in substantially the same horizontal plane in the upper end of slots formed in a solid cylindrical rod of a material having longitudinal and transverse velocities much higher than water. The transducers direct the beams downwardly of the rod and at an angle to the horizontal plane of the transducers. The slots of the rod are filled with a fluid other than the borehole fluid, retained therein by an acoustically transparent jacket, of low absorption and of an acoustic velocity higher than the borehole fluid so that the beams from the transducers are deviated towards the borehole wall as they emerge from the slots.

The transducers are spaced radially of the rod and are switched sequentially so as to map the entire borehole wall. The entire apparatus can be moved up the borehole along its axis so as to observe the same wall spot several times. A superposition of the several observations improves the ratio of the coherent signal to the random disturbances thus improving the resolution of the borehole irregularities.

DESCRIPTION OF THE PREFERRED EMBODIMENT

Figures 1, 2:
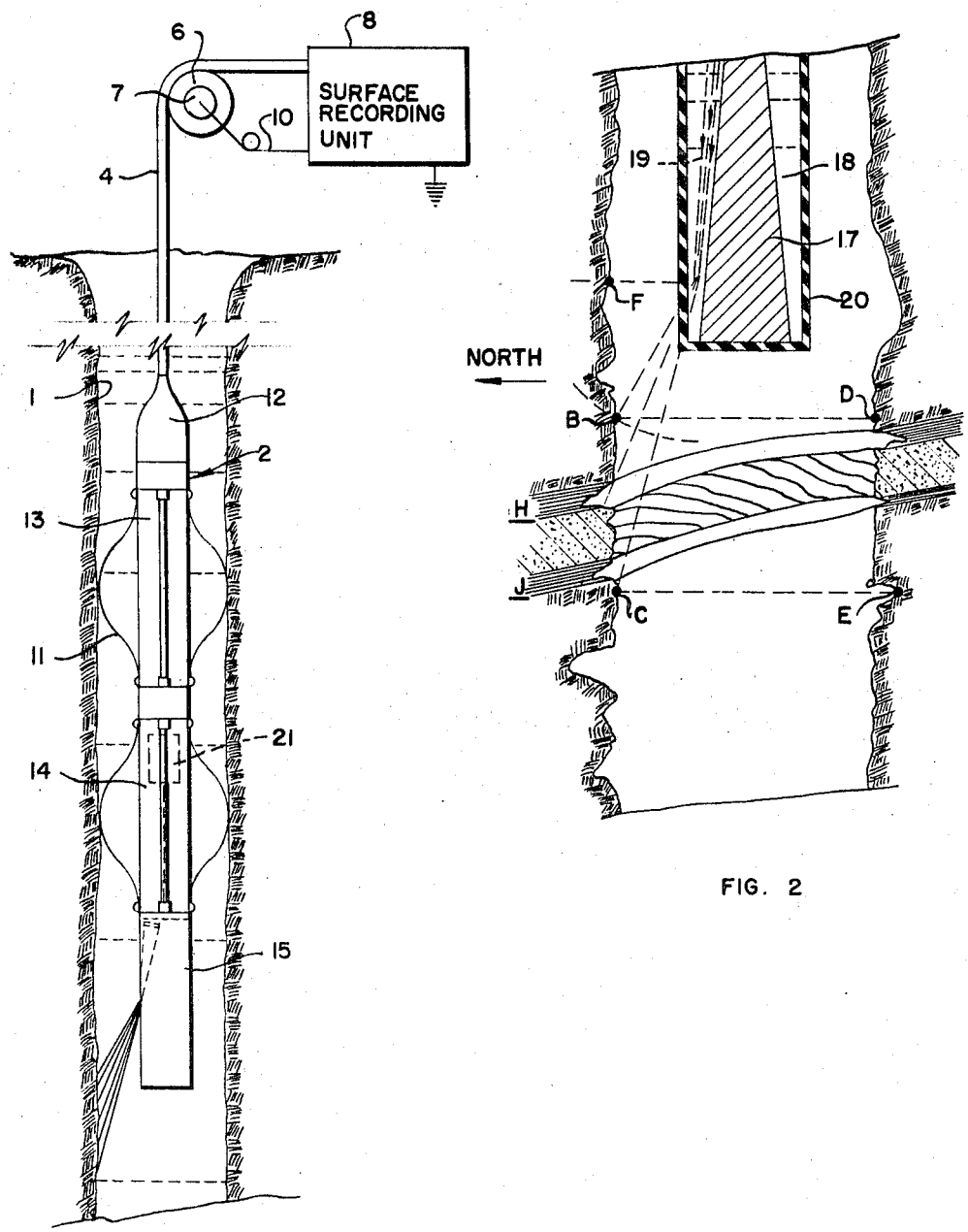
FIGURE 1 is an elevation view of a cross-section of a borehole showing apparatus for carrying out applicant's invention disposed therein.
FIGURE 2 is a detailed elevation view of the borehole cross-section of FIGURE 1 with the acoustic scanner of the apparatus in operating position.

Referring to FIGURE 1, the apparatus of the present invention is similar in structure and operation to that disclosed in Ser. No. 724,182, filed Apr. 25, 1968. An elongated tubular housing 2 is shown which is adapted to be lowered into a borehole 1 at the end of a cable 4, preferably a coaxial or multiconductor insulated cable. The cable 4 passes over a suitably powered and calibrated reel 6 which may be coupled or associated with a Selsyn generator 7. The cable 4 is electrically connected to a surface recording unit 8, comprising the desired amplifying, synchronizing and indicating or recording elements. Cable 4 is also provided with sufficient mechanical strength to permit the lowering and raising of housing 2 within borehole 1.

The reel 6, or preferably the output of the Selsyn generator 7, is electrically connected to the unit 8 through a conductor 10 in order that the depth or level of the housing 2 may be measured or recorded at any instant together with the desired indications from the housing 2, as will appear hereinbelow.

The housing 2 consists of a plurality of tubular members, preferably held in fluid-tight screw-threaded engagement with each other. The housing 2 is provided with centering devices 11 to maintain the housing 2 centered within the borehole 1. The tubular members of housing 2 may comprise an upper head connector 12, through which mechanical and electical connection is effected between the housing 2 and the cable 4. An inclinometer and azimuth measuring device 13 or comparable means is disposed in housing 2 and coupled to the surface unit 8 through conductors (not shown) within cable 4. The inclinometer and azimuth measuring device 13 is preferably of the type that measures the inclination and the azimuth of the inclination of the housing 2 and supplied related electrical signals. Various types of devices for fulfilling these requirements are known and shown in the prior art. Thus, no description is included in the present application. Also, the azimuthal orientation of the tool in the borehole can be determined by conventional means. One such method is disclosed in a patent to Doll, Ser. No. 2,427,950. Accordingly, the northerly direction is indicated by the arrow in FIGURE 2 wherein line B–C correlates to the line B–C in FIGURE 5.

An acoustic instrumentation section 14 is disposed within housing 2 and contains therein conventional acoustic transmitting and receiving apparatus. The acoustic instrumentation section 14 includes an acoustic scanner 15 containing therein a plurality of transmitting-receiving transducers 16 (see FIGURE 3). The scanner 15 is shown in detail in FIGURES 2 through 4. Transducers having relatively large diameters compared to the wave lengths of the generated waves (such as at least about ½ wave length) are preferred, as for example, piezoelectric crystals.

Figure 3:
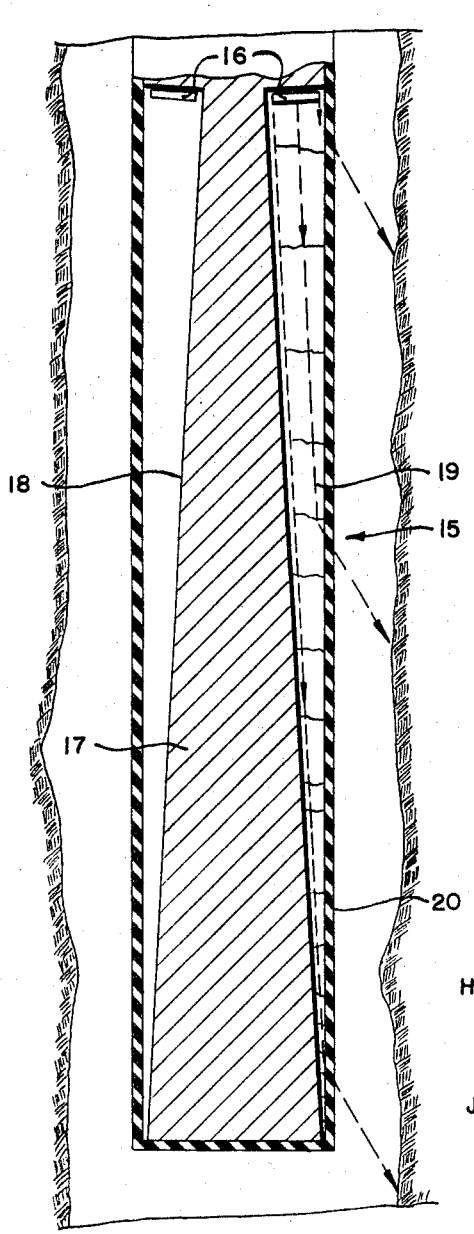
FIGURE 3 is a vertical sectional view of an element of FIGURE 1.

In FIGURE 3, the transducers 16 are preferably excited at an ultrasonic frequency and inclined relative to the surface of the borehole wall at a small angle at which substantially all of the acoustic waves from transducers 16 are glancingly reflected from a strip along the wall when the wall surface is smooth.

In order to eliminate acoustic radiation out of the ports of slots in other directions, the transducers 16 are preferably housed in a solid cylindrical rod 17. Rod 17 is preferably formed of a material having longitudinal and transverse acoustic velocities higher than that of water as, for example, steel. The rod is slotted radially in the manner illustrated in FIGURE 4. The slots 18 extend longitudinally of the rod 17 as seen in FIGURE 3. The area of the slots in the outer wall of rod 17 controls the fraction of energy radiated outwardly per unit of distance traveled by the pulse. In general, it is desirable to have an outer metal wall enclosing the slots with only small ports or slits to permit radiation.

Thus, acoustic transducers 16 suitable for generating a specific mode within the slot are located at the top of and within each of the peripheral slots 18 and angled so as to direct their acoustic rays along the axis of the slot. The slots 18 act as acoustic leaky wave guide ducts to guide the acoustic energy down the length of the rod 17. The rays emerging from rod 17 are all at substantially the same angle to the longitudinal axis of rod 17. Preferred dimensions for the rod 17 are approximately four inches in diameter and three feet in length. The slot width is such as to provide a simple normal mode of propagation at the frequency of the acoustic energy radiated by the transducers 16. For any given frequency and wave guide dimensions, several different phase velocities are possible depending upon the pressure distribution within the tube. These different pressure distributions are called modes. The slots are preferably filled with a fluid other than the borehole fluid having a low acoustic absorption and an acoustic velocity higher than that of the borehole fluid in order to cause the energy to be radiated into the borehole fluid and the rays to deviate towards the borehole wall as they emerge from slots 18. An acoustically transparent jacket 20, as for example, rubber having an acoustic velocity intermediate between the fluid within slots 18 and the borehole fluid, surrounds rod 17 in order to retain the fluid within the slots 18 therein. The energy stays in the slot because the frequency and geometry correspond to a mode which propagates without attenuation. The steel walls act as an interface between the fluid within slots 18 and the borehole fluid. As the rays 19 emerge from the slots 18 as can be seen in FIGURE 3, because of the selection of materials having the acoustic velocities as discussed above, the result is as if the fluid within slots 18 and the borehole fluid were directly adjacent each other. The jacket 20 and rod 17 thus act as an interface between the fluids.

The acoustic instrumentation section 14 of the housing 2 contains instrumentation 21 for selectively actuating in sequence the radially, spaced transducers 16. For example, any conventional type of stepping switch arrangement coupled by electrical connection means (not shown) to recording unit 8 is contemplated; the transducers 16 could also be actuated manually, if desired. The preferred selective actuation instrumentation may be conventional transistor switches which are well known in the art. Thus, the acoustic rays from transducers 16 are transmitted down the slots 18 as indicated in FIGURE 3 and, upon reflection from irregularities in the wall as will be discussed shortly, travel back along the same ray paths.

In operation, the transducers 16 are selectively energized so as to generate a pulsed beam of ultrasonic radiation which is transmitted outwardly through the borehole fluid towards the borehole wall from a predetermined position and at a known azimuth angle to the borehole axis as can best be seen in FIGURE 2. At the surface of the borehole wall, the pulsed beam from one transducer 16 is refracted and travels along the surface of the borehole wall until it encounters a substantial discontinuity or change in the substantially constant borehole diameter, a portion of the pulsed beam being reflected back towards the transmitting-receiving transducer 16. Thus, the acoustic pulses from transducer 16 are beamed at an angle that selectively provides glancing reflection where the borehole diameter is substantially smooth and, as is well known in the well logging art, the travel times of the beams through the slots is used to indicate the distances along the walls of any substantial irregularities in the substantially constant borehole diameter which reflect acoustic energy back to the point of transmission.

After one of the transducers 16 has generated a beam, it is switched by means well known in the art to a receiving condition to receive the reflected radiation. If the pulsed beam from transducer 16 encounters any irregularity in the borehole wall from which no ultrasonic radiation is reflected, energy will be reflected back to transducer 16. Perfectly smooth regions of the borehole wall will be manifested by a lack of returning energy. Of course, additional receiving transducers located in slots 18 and substantially adjacent transducers 16 could be provided to also receive the reflected signals as is well known in the art. These reflected signals are transmitted to the surface recording unit 8 in order that the travel time of the acoustic impulse over a known interval in the earth material can be measured. This measured travel time can be used to control the recording system in the conventional manner, if desired.

In order that the transducers 16 may sweep or map the complete surface of the borehole wall, the transducers 16 are sequentially activated by means of the instrumentation 21 in housing 2. The transducers 16 are coupled to the equipment in the acoustic instrumentation section 14 for recording the signals as is well known in the acoustic logging art. One such recording system is described in detail in a copending application to Smith et al., Ser. No. 527,328, filed Feb. 14, 1966.

Figure 4:
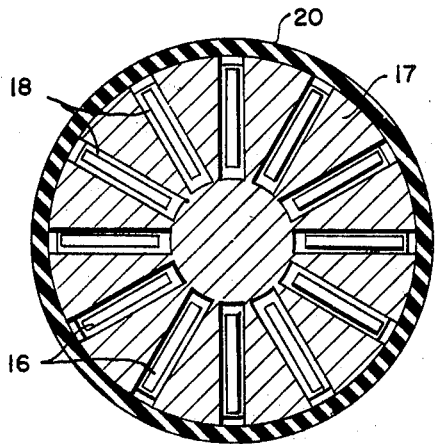
FIGURE 4 is a top plan view of the element of FIGURE 3.
Figure 5:
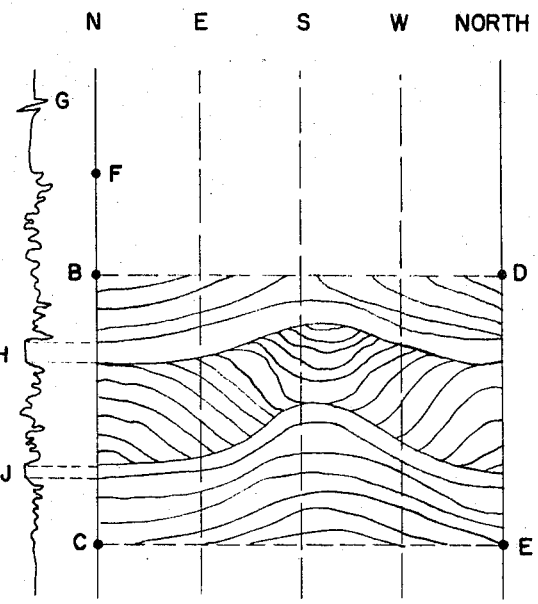
FIGURE 5 is a graphical recording of the full section of the borehole of FIGURE 1.

In FIGURE 2, sequentially actuating all of the transducers 16 of FIGURE 4 from one point within slots 18 to a point diametrically opposite the first point would map one side of the wall of a borehole such as shown in FIGURE 1. A full circumferential section may be recorded by sequentially actuating all of the transducers 16 as shown in FIGURE 5. The electrical signals supplied to surface recording unit 8 are reflection-indicating electrical signals which are related to amplitude versus time characteristics of the acoustic waves which encounter discontinuities in the wall surface and are reflected back to substantially the point at which they were produced.

As can be seen in FIGURE 5, the record produced by each pulsed beam from one of the transducers 16 is a recorded line representing the pattern of acoustic reflectors encountered along a narrow strip of the borehole wall. For example, the portion of the borehole wall lying along the line B-C results in the variable amplitude trace appearing to the left of FIGURE 5 or the corresponding variable density trace shown along the line N in FIGURE 5.

The transmission of a pulsed beam from one of the transducers 16 results in an energy pulse or "shot break" at G, then, in the situation shown in FIGURE 2, the first reflected energy arrives from F from the first contact between an acoustic wave front and the nearest portion of the borehole wall. As the wave front progresses from the transmitter-receiver transducer 16, its contact with the borehole wall progresses downhole through points B and C. Each contact produces a certain amount of reflected acoustic energy which transducer 16 picks up (in its receiving condition) since such wall surfaces are normally rough and reflect at least some noise energy back to transducer 16. Obviously, increasing time from the "shot break" at G is a function of increasing distance between the points from which acoustic waves are reflected and the points of acoustic wave transmission and reception.

For recording purposes, the recording unit 8 is actuated at a reflected time such as B for the start of the reflection receptions and closed at C when the amplitude of the reflected energy may start to dwindle or become meaningless. The sequential actuation of the transducers 16 with subsequent transmission of pulsed beams from the transducers 16 produces other similar record lines building towards a full map of a circumferential section of the borehole wall. Thus, a closely packed series of recorded lines, each line representing the pattern of the reflectors encountered along a narrow vertical strip of the borehole wall parallel to line B-C in FIGURE 2, is produced as a result of the acoustic energy reflected from the borehole wall from one pulse of each of the transducers 16.

Since the reflected energy will vary only with the borehole wall surface condition, texture, or shape, minute variations such as crossbedding and sand grain orientation may appear. The ability of the transducers 16 to pick up this information depends on the acoustic frequency used and the elimination of noise by means of sound absorbers and electronic filters or the like means for improving signal-to-noise ratio. The most important borehole wall mapping information may result from the "shadows" or lack of reflected energy as shown by the straight line gaps at H and J in FIGURE 3 indicating where eroded streaks have been encountered along the borehole wall.

The housing 2 is preferably raised in the borehole 1 along the borehole axis at a rate that permits observation of the same wall spot from different vertical angles for the best feature resolution. The effective axis of the transmitter 16 is preferably swept around the axis of the borehole at a rate (relative to the rate at which the tool is moved along the axis of the borehole) such that more than one circumferential sweep is completed before the tool has moved along the borehole axis by a distance equalling the length of the longitudinal strips of borehole wall that are swept by the beamed impulses. This causes an anomaly, such as the intersection of the line B-C with the eroded streak H, to be once contacted by acoustic waves when the tool is in a relatively low position, as shown in FIGURE 2, and again when the tool is in a higher position within the well borehole. The waves reflected from the first of such contacts would be received at the time after the impulse production that is indicated by the distance between G and H on FIGURE 5. From the second of such contacts, the waves reflected from the same anomaly would be received at a later time at which the transducer axis has the same compass bearing and the record-marking element for producing the visible record has the same position relative to the record. Thus, by using an oscilloscope on which a display of the first circumferential sweep of the borehole wall is retained and is modified by a display of at least one subsequent sweep, a series of reflections are received from a given reflector from different distances such that the reflection signals add and supplement each other while the noise signals tend to cancel each other. This enhances the signal-to-noise ratio of the recording. Such a record enhancement can be accomplished by means of conventional memory-type oscilloscopes or by repetitively exposing a photographic film by means of procedures and equipment known to those skilled in the art.

Several methods may be used for recording the information received at the surface recording unit 8. One versatile method is a form of direct recording or photographing an oscilloscope screen as discussed in a patent to Peterson, No. 3,093,810. This invention pertains primarily to the technique of obtaining electrical signal energy which can be used in many different ways to represent a section of a borehole wall.

I claim as my invention:

1. Apparatus for investigating subterranean formations adjacent to a borehole containing borehole fluid which comprises, in combination:

a cylindrical housing;

a cable operatively engaging said housing for lowering said housing into a borehole;

said housing being composed of a material having longitudinal and transverse acoustic velocities substantially higher than that of water;

a plurality of radial slots formed within said housing extending equally spaced about the periphery of said housing and longitudinally thereof;

acoustic transducer means fixedly located in the upper portion of each of said slots and on substantially the same horizontal plane and adapted to produce a pulsed beam of high frequency acoustic waves downwardly of said housing, transmit a beam of said acoustic waves through the fluid within the borehole and receive the ultrasonic radiation reflection of said acoustic waves;

said transducer means being adapted to direct the pulsed beams outwardly of the housing from a plurality of closely spaced predetermined positions and at a known angle to each of said fixed transducer means;

each of said slots containing a fluid of low acoustic absorption and of an acoustic velocity higher than that of the borehole fluid so as to cause the pulsed beams to be radiated through the borehole fluid and deviate towards the borehole wall at an acute angle thereto as they emerge from the slots;

selective transducer operating means operatively engaging all of said transducer means for selectively operating each of said transducer means;

acoustically transparent jacket means surrounding said housing for containing the low acoustic absorption fluids within said slots;

acoustic instrumentation means located within said housing and operatively engaging said transducer means for converting electrical energy into ultrasonic radiation and for converting ultrasonic radiation into electrical energy; and surface recording means operatively engaging said acoustic instrumentation means for recording the electrical energy received from said acoustic instrumentation means as a closely stacked series of signals each representing a surface strip of the adjacent formations.

References Cited

UNITED STATES PATENTS

| | | | |
|---|---|---|---|
| 2,825,044 | 2/1958 | Peterson | 340—18 |
| 3,021,706 | 2/1962 | Cook et al. | |
| 3,138,219 | 6/1964 | Blizard | 181—0.5 |
| 3,369,626 | 2/1968 | Zemanek | 340—18 |
| 2,206,923 | 7/1940 | Southworth | 333—95 X |
| 2,433,368 | 12/1947 | Johnson et al. | 333—95 X |
| 2,602,893 | 7/1912 | Ratliff | 333—95 X |
| 3,390,737 | 7/1968 | Johnson | 181—0.5 |

FOREIGN PATENTS 928,583  6/1963  Great Britain.

BENJAMIN A. BORCHELT, Primary Examiner

JAMES FOX, Assistant Examiner

U.S. Cl. X.R.

73—67.8; 333—71, 95